(12) United States Patent
Xu (10) Patent No.: US 10,664,145 B2
(45) Date of Patent: May 26, 2020

(54) UNLOCKING CONTROL METHODS AND APPARATUSES, AND ELECTRONIC DEVICES

(71) Applicant: BEIJING ZHIGU RUI TUO TECH CO., LTD., Beijing (CN)

(72) Inventor: Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 211 days.

(21) Appl. No.: 15/540,365

(22) PCT Filed: Nov. 20, 2015

(86) PCT No.: PCT/CN2015/095083
§ 371 (c)(1),
(2) Date: Jun. 28, 2017

(87) PCT Pub. No.: WO2016/107328
PCT Pub. Date: Jul. 7, 2016

(65) Prior Publication Data
US 2017/0344234 A1 Nov. 30, 2017

(30) Foreign Application Priority Data
Dec. 31, 2014 (CN) .......................... 2014 1 0853053

(51) Int. Cl.
*G06F 21/31* (2013.01)
*G06F 3/0484* (2013.01)
(Continued)

(52) U.S. Cl.
CPC ...... *G06F 3/04845* (2013.01); *G06F 3/04883* (2013.01); *G06F 21/31* (2013.01); *G06F 21/36* (2013.01); *G06F 21/40* (2013.01)

(58) Field of Classification Search
CPC ........ G06F 3/0488; G06F 3/017; G06F 3/048; G06F 3/167; G06F 3/04845;
(Continued)

(56) References Cited

U.S. PATENT DOCUMENTS

2014/0310643 A1 10/2014 Karmanenko et al.

FOREIGN PATENT DOCUMENTS

| CN | 103370924 A | 10/2013 |
|---|---|---|
| CN | 103995667 A | 8/2014 |
| CN | 104462907 A | 3/2015 |

OTHER PUBLICATIONS

DeLuca et. al. (2013). Back-of-Device Authentication on Smartphones. (Year: 2013).*

(Continued)

*Primary Examiner* — Brian F Shaw
(74) *Attorney, Agent, or Firm* — Sheppard Mullin Richter & Hampton LLP (57) ABSTRACT

This application discloses various unlocking control methods and apparatuses, and various electronic devices. An unlocking control method disclosed herein comprises: in response to an orientation of a to-be-unlocked first control plane of an electronic device as a reference orientation, acquiring second unlocking input information through a second control plane of the electronic device, and an orientation of the second control plane and the orientation of the first control plane being different; according to the second unlocking input information, unlocking the first control plane. This application improves privacy and security of the unlocking control.

39 Claims, 5 Drawing Sheets

---

In response to an orientation of a to-be-unlocked first control plane of an electronic device as a reference orientation, acquire second unlocking input information through a second control plane of the electronic device, and an orientation of the second control plane and the orientation of the first control plane are different ⸺ S101

Unlock the first control plane according to the second unlocking input information ⸺ S102

(51) Int. Cl.
*G06F 21/36* (2013.01)
*G06F 3/0488* (2013.01)
*G06F 21/40* (2013.01)

(58) Field of Classification Search
CPC ........ G06F 3/04883; G06F 3/01; G06F 1/162;
G06F 1/40; G06F 1/36; G06F 1/31; G06F
21/31; G06F 21/40; G06F 21/44; H04L
43/16; H04W 52/0258; H04W 4/025;
H04M 2250/12; H04M 2250/22
See application file for complete search history.

(56) References Cited

OTHER PUBLICATIONS

Machine Translation of CN103995667 (Aug. 20, 2014) (Year: 2014).*
International Search Report and Written Opinion for Application No. PCT/CN2015/095083, dated Feb. 19, 2016, 8 pages.

\* cited by examiner

UNLOCKING CONTROL METHODS AND APPARATUSES, AND ELECTRONIC DEVICES

CROSS-REFERENCE TO RELATED APPLICATIONS

This application is a National Phase Application of International Application No. PCT/CN2015/095083, filed on Nov. 20, 2015, which claims priority to and benefit of Chinese Patent Application No. 201410853053.8, filed on Dec. 31, 2014, and entitled "Unlocking Control Methods and Apparatuses, and Electronic Devices", each of which is herein incorporated by reference in its entirety.

TECHNICAL FIELD

This application generally relates to the field of electronic technologies, and in particular, to various unlocking control methods and apparatuses, and various electronic devices.

BACKGROUND

Currently, with the development of the electronic technologies, many new types of the electronic devices have been developed. Electronic devices such as mobile phones gradually develop into double display screens from a conventional single display screen. For example, a mobile phone with double display screens comprises: a first display screen on the front set to display normal power, and a second display screen on the back set to display low power. The mobile phone extends a human-machine interactive interface to the back of the mobile phone from the front of the mobile phone to better satisfy an application need of a user. With the continuous development of the electronic technologies such as flexible display screens, electronic devices with double display screens or even more display screens may become increasingly popular.

SUMMARY

Brief description of this application is given in the following to provide basic understanding of some aspects related to this application. It should be understood that this summary is not an exhaustive summary of this application. It does not intend to determine the key or important parts of this application; neither does it intend to limit the scope of this application. The purpose of this summary is to give some concepts in a simplified form on which more detailed description will be developed.

Embodiments of this application provide various unlocking control methods and apparatuses, and various electronic devices.

In the first aspect, the embodiments of this application provide an unlocking control method, comprising:

in response to an orientation of a to-be-unlocked first control plane of an electronic device as a reference orientation, acquiring second unlocking input information through a second control plane of the electronic device, and an orientation of the second control plane and the orientation of the first control plane being different; and unlocking the first control plane according to the second unlocking input information.

In the second aspect, the embodiments of this application provide an unlocking control apparatus, comprising:

a second unlocking input information acquiring module, configured to: in response to an orientation of a to-be-unlocked first control plane of an electronic device as a reference orientation, acquire second unlocking input information through a second control plane of the electronic device, and an orientation of the second control plane and the orientation of the first control plane being different; and a second unlocking control module, configured to unlock the first control plane according to the second unlocking input information.

In the third aspect, the embodiments of this application provide an electronic device, comprising at least two control planes with different orientations and any unlocking control apparatus that is provided by the embodiments of this application.

Technical solutions provided by the embodiments of this application may make full use of the characteristic that an electronic device has at least two control planes with different orientations. Under the circumstance that the to-be-unlocked first control plane needs to be unlocking controlled, according to the orientation of the first control plane and a reference orientation, determining a corresponding unlocking input information acquiring strategy; if the orientation of the first control plane is the reference orientation, acquiring second unlocking input information through a second control plane of another orientation of the electronic device; and according to the second unlocking input information, unlocking the first control plane. The solution enables the unlocking control information of the first control plane to be input on the second control plane whose orientation of is different from the orientation of the reference orientation, so the risk of the unlocking control information of the first control plane being acquired by other people or a detection device is reduced, thereby improving privacy and security of the unlocking control.

These and other advantages of this application will be more obvious through the detailed description of optional embodiments of this application with reference to the accompanying drawings.

BRIEF DESCRIPTION OF THE DRAWINGS

This application may be better understood with reference to the description that is given with reference to accompanying drawings, and a same or similar reference numeral is used in all accompanying drawings to represent a same or similar component. The accompanying drawings together with the following detailed description are comprised in the specification and form a part of the specification, and are configured to further illustrate optional embodiments of this application by example and explain the principle and advantages of this application. In the accompanying drawings.

A person skilled in the art should understand that elements in the accompanying drawings are displayed for simplicity and clarity, and not necessarily to scale. For example, some elements in the accompanying drawings may be enlarged in size relative to other elements to facilitate understanding of the embodiments of this application.

DETAILED DESCRIPTION

Exemplary embodiments of this application are described in detail in the following article with reference to accompanying drawings. For clarity and conciseness, not all characteristics of a practical implementation manner are described in detail. However, it should be understood that during developing any practical embodiment, many decisions specific to the practical implementation manner must be made, to meet the particular target of the developer, for example, to conform to those limitation conditions related to the system and the business, and those limitation conditions may vary with different implementation manners. In addition, it should also be understood that a development effort might be very complex and time consuming, a person skilled in the art and will benefit from this disclosure in actual implementations.

Here, it should be further illustrated that in order not to obscure this application because of unnecessary details, not all apparatus structures and/or processing steps related to solutions of this application are described in detail in the accompanying drawings and the specification. Components, and indication and description of the process are known to a person of ordinary skill in the art are omitted.

Specific implementation manners of this application are further described in detail with reference to the accompanying drawings (the same reference number in some accompanying drawings represents the same element) and embodiments. The following embodiments are used to describe this application, but not to limit the scope of this application.

A person skilled in the art may understand that terms such as "first" and "second" in this application are merely used to distinguish different steps, devices, or modules. Neither do these terms represent any particular technical meaning, nor do they show any necessary logical sequence.

Figure 1:
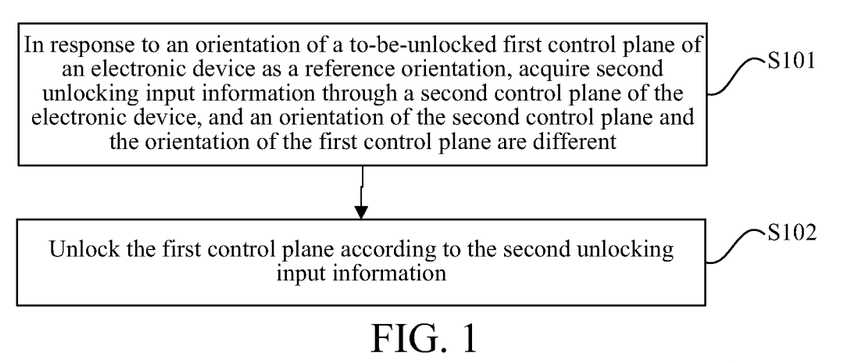
FIG. 1 is a flowchart of an unlocking control method provided by an embodiment of this application.

FIG. 1 is a flowchart of an unlocking control method provided by an embodiment of this application. The unlocking control method provided by this application is executed by some unlocking control apparatus. The unlocking control apparatus performs unlocking control on a to-be-unlocked control plane of an electronic device through executing the unlocking control method. A device representation form of the unlocking control apparatus is not limited. For example, the unlocking control apparatus may be an independent component. The component communicates with an electronic device to realize the control to the electronic device. Or the unlocking control apparatus may also be integrated within an electronic device as a functional module, etc., which is not limited by this application. Specifically, as shown in FIG. 1, the embodiments of this application provide an unlocking control method, comprising:

S101: In response to an orientation of a to-be-unlocked first control plane of an electronic device as a reference orientation, acquire second unlocking input information through a second control plane of the electronic device, and an orientation of the second control plane and the orientation of the first control plane are different.

The electronic device described in the embodiments of this application has at least two control planes with different orientations, that is, the electronic device at least comprises a first control plane and a second control plane. A specific device type of the electronic device is not limited. For example, it may comprise but is not limited to a double-screen or a multiple-screen mobile phone, and a portable electronic device such as a double-screen or a multiple-screen tablet. The control plane is a plane of the electronic device with a control function. The control plane may comprise but is not limited to a touch screen, a keypad, a plane supporting a non-contact control manner such as voice, a gesture, infrared signal or a plane supporting two or more foregoing control manners.

In practical use, in order to improve privacy protection and security of an electronic device, a locking function such as locking screen or locking keys may be provided to a control plane of the electronic device. To resume a normal operation or a normal function display on the locked control plane, the control plane needs to be unlocked.

The first control plane in the embodiments of this application may be any control plane of an electronic device. The first control plane is to be unlocked. During the implementation of the embodiments of this application, the inventor of this application discovers that if a user unlocks on the control plane of the electronic device facing the user, limited by a factor such as environment, other people or a detecting device may easily see the control plane and operation information on the control plane of the user, which makes the risk of unlocking information input by the user being acquired by other people or a detecting device relatively higher. Privacy and content security of the user might be negatively affected to some degree.

However, for an electronic device with at least two control planes with different orientations, to securely unlock the first control plane, a corresponding unlocking input information acquiring strategy may be determined according to the orientation of the first control plane and a reference orientation.

The reference orientation may be determined flexibly according to actual needs. For example, in view of the practical environment, the reference orientation may be determined according to the orientation in which the unlocking input information is easily acquired by other people or a detecting device in the environment. The orientation of the to-be-unlocked first control plane may be compared with the reference orientation. If current orientation of the first control plane is the same as the reference orientation, it shows that the possibility that the current information of the first control plane is acquired by other people or a detecting device in the environment is relatively high. Under this circumstance, a characteristic that the electronic device has at least two control planes with different orientations may be used to acquire unlocking input information of the first control plane through other control planes (such as a second control plane) whose orientations are different from that of the first control plane. Unlocking input information acquired through the second control plane and used to unlock the first control plane might be called second unlocking input information.

S102: Unlocking the first control plane according to the second unlocking input information.

A specific representation form of the second unlocking input information may be determined according to actual needs. For example, the specific representation form may comprise but is not limited to: a particular gesture, particular touch track, and a particular key operation manner, which is not limited by this application. During practical implementation, authorized unlocking input information may be predetermined. The second unlocking input information acquired through the second control plane is compared with the authorized unlocking input information. If the two match, the first control plane is successfully unlocked, and an operation control or a content display on the first control plane may be resumed. If the two do not match, the first control plane fails to be unlocked, and the first control plane is still in a locked state.

Technical solutions provided by the embodiments of this application may make full use of the characteristic that an electronic device has at least two control planes with different orientations. Under the circumstance that the to-be-unlocked first control plane needs to be unlocking controlled, according to the orientation of the first control plane and a reference orientation, determining a corresponding unlocking input information acquiring strategy; if the orientation of the first control plane is the reference orientation, acquiring second unlocking input information through a second control plane of another orientation of the electronic device; and according to the second unlocking input information, unlocking the first control plane. The solution enables the unlocking control information of the first control plane to be input on the second control plane whose orientation of is different from the orientation of the reference orientation, so that the possibility that the unlocking control information of the first control plane is acquired by other people or a detection device is reduced, thereby improving privacy and security of the unlocking control.

Based on the foregoing technical solutions, the unlocking control method provided by the embodiments of this application may further comprise: in response to the orientation of the first control plane being different from the orientation of the reference orientation, acquiring first unlocking input information through the first control plane; and unlocking the first control plane according to the first unlocking input information. That is, if current orientation of the first control plane is different from the orientation of the reference orientation, it shows that the possibility that the unlocking input information on the first control plane of a user is acquired by other people or a detecting device in the environment is relatively low, in such cases, a user may acquire the unlocking input information (that is first unlocking input information) through the first control plane. A specific representation form of the first unlocking input information may be determined according to actual needs. For example, the specific representation form may comprise but is not limited to: a particular gesture, particular touch track, and a particular key operation manner, which is not limited by this application. This solution, according to the orientation of the first control plane, may flexibly determine whether it needs to be switched into a second control plane to acquire the unlocking input information, which improves the flexibility of this solution.

Optionally, the reference orientation is an orientation facing a user. Practice shows that the orientation facing the user is usually the orientation from which other people or a detecting device in the environment relatively easily acquires the input information of the user. The meaning of the "orientation" is that when a control plane is confronted with human eyes of the user, the human eyes may directly see the control plane. This solution determines the orientation facing the user as the reference orientation, which may improve universality of the solution.

Optionally, the orientation of the second control plane and that of the first control plane are opposite. For example, the orientation of the first control plane is the same as the reference orientation. The orientation of the second control plane and the reference orientation are opposite, and vice versa. Under the circumstance that the orientation of the first control plane is the same as the reference orientation, this solution may acquire second unlocking input information configured to unlock the first control plane through the second control plane whose orientation is opposite to the orientation of the first control plane. The orientation of the second control plane is opposite to the orientation of the first control plane. Therefore, when a user inputs the second unlocking input information through the second control plane, the first control plane, to a certain degree, blocks input or display information of the second control plane, thereby improving security of the unlocking input information.

The first unlocking input information and the second unlocking input information may be set to be the same or different according to actual needs. An implementation manner is very flexible.

For example, the first unlocking input information and the second unlocking input information are the same. This solution switches a control plane configured to acquire the unlocking input information between two control planes with different orientations of an electronic device to improve security of the unlocking input information.

Figure 2:
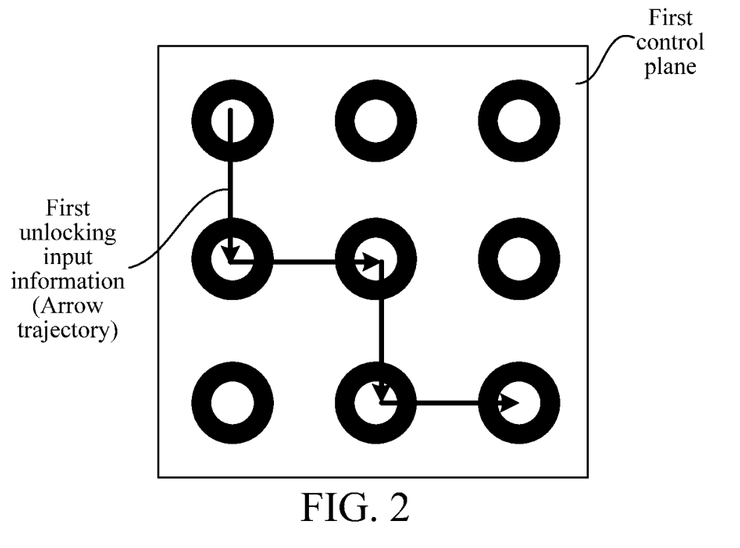
FIG. 2 is an optional form of first unlocking control information provided by an embodiment of this application.
Figure 3A:
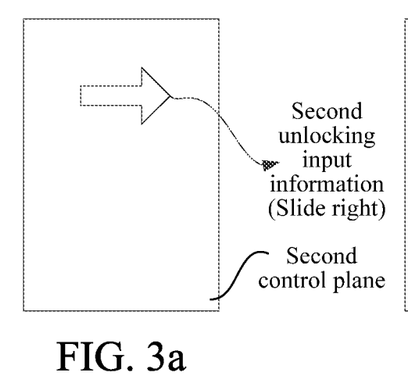
FIG. 3a to FIG. 3f are exemplary forms of second unlocking control information provided by an embodiment of this application.
Figure 3B:
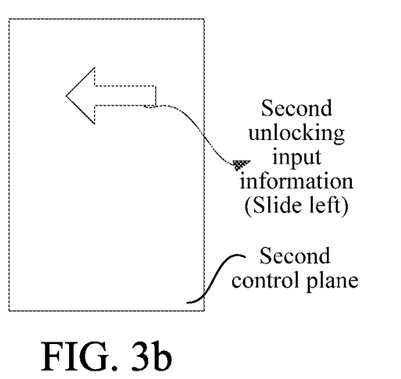
Figure 3C:
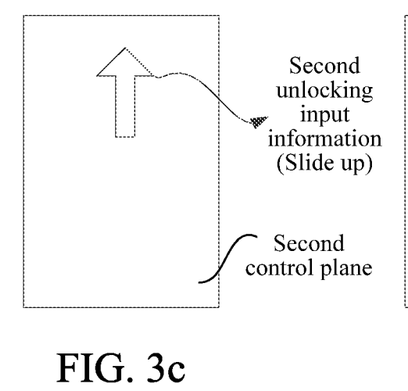
Figure 3D:
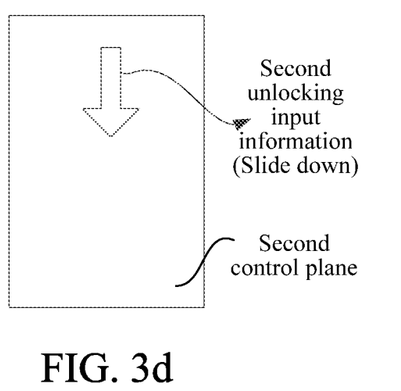
Figure 3E:
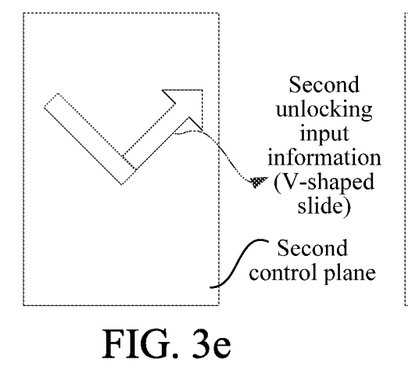
Figure 3F:
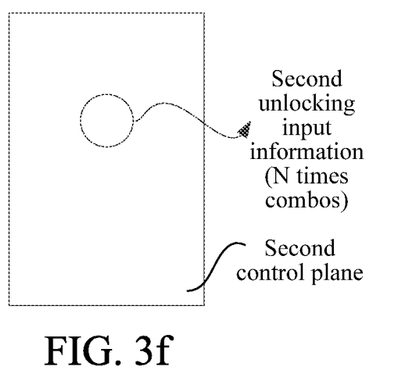

For another example, the first unlocking input information and the second unlocking input information are different. Under some circumstances, an orientation of a control plane affects convenience and/or accuracy of device detection of the operation of a user. For example, if the orientation of the first control plane is an orientation facing the user, the first control plane is visible to the user. The user operates conveniently. At this moment, relatively complex unlocking input information may be set to improve the security of information. If the orientation of a first control plane is the orientation with its back to a user, the first control plane may be invisible to the user. Blind operation for the user may be relatively inconvenient. At this moment, input information which is relatively easy or convenient for user to input through blind operation may be chosen as second unlocking input information acquired through the second control plane. Using the first control plane being opposite to the second control plane, and the orientation of the first control plane being the same as the reference orientation (for example, both are orientations facing a user) as example, an optional representation form of first unlocking control information input through the first control plane is as shown in FIG. 2. An optional representation form of second unlocking control information input through the second control plane is as shown in FIG. 3*a* to FIG. 3*f*. The unlocking input information is simple and convenient for a user to input, and may facilitate accurate detection. In an application scenario that a corresponding user holds the electronic device, the first control plane may be a front of the electronic device facing the user. The second control plane is correspondingly a back of the electronic device whose back is to the user. Content displayed on the back is invisible. The user inputs any second unlocking control information as shown in FIG. 3*a* to FIG. 3*f* on the back. According to habits of the user, operations such as touching and pressing may be performed by a forefinger of the holding hand, and most part of the forefinger may be blocked by a housing of the electronic device, which makes the input on the back by the user not to be observed or inferred easily from the front. Therefore, to some degree, security of the unlocking information and privacy of the unlocking control are improved.

In the technical solution provided by the embodiments of this application, optionally, before the acquiring the second unlocking input information through the second control plane, the method further comprises: determining the orientation of the first control plane as the reference orientation. This solution, after the determining the orientation of the first control plane as the reference orientation, switches to the second control plane to acquire the second unlocking input information configured to unlock the first control plane, which may be compatible with conventional unlocking manners. The determining method for the orientation of the first control plane as the reference orientation may be determined according to actual needs. An implementation manner is very flexible.

An optional implementation manner may adopt a human-machine interactive manner, and a user participates in the determining of the orientation of the first control plane. For example, an unlocking control apparatus may acquire first input information configured to represent whether the orientation of the first control plane is the reference orientation, according to the first input information, determining the orientation of the first control plane as the reference orientation. Specifically and optionally, selecting information that determines whether the orientation of the first control plane is the reference orientation may be displayed on the first control plane, according to an input result of the information selected by the user, determining whether the orientation of the first control plane is the reference orientation; if the user selects "Yes", determining the orientation of the first control plane as the reference orientation; or if the user selects "No", determining the orientation of the first control plane being different from the reference orientation. This solution is easy to be implemented.

In another optional implementation manner, an unlocking control apparatus may determine automatically, with reference to one or more kind of information, the orientation of the first control plane as the reference orientation. The following may use an optional circumstance where the reference orientation is the orientation facing the user, and the orientation of the first control plane being opposite to the orientation of the second control plane as example, to further illustrate an optional manner of automatically determining the orientation of the first control plane as the reference orientation. In cases where the reference orientation is another orientation, and/or the orientation of the first control plane has other relative orientation relationship with the orientation of the second control plane, the unlocking control method is similar, which is not described in the embodiments of this application.

Optionally, the determining the orientation of the first control plane as the reference orientation comprises: collecting an image along the orientation of the first control plane; identifying the image; determining the orientation of the first control plane as the reference orientation at least according to an identifying result of the image. The orientation of the first control plane is different from that of the second control plane. Therefore, images collected along different orientations have differences. The identifying result of the collected image may be a basis for determining whether the orientation of the first control plane is the reference orientation. For example, many electronic devices are provided with at least one image acquisition components such as a camera. During a process of practical application, an image may be collected along the orientation of the first control plane through an image acquisition component such as a camera disposed on the first control plane. The image is identified, for example, to identify whether there is a reference object such as a human face. If there is a reference object, it shows that the possibility that a current orientation of the first control plane is an orientation facing a user is relatively high. At this moment, the orientation of the first control plane may be determined as the orientation (that is the reference orientation) facing the user; or if there is no reference object, it shows the possibility that a current orientation of the first control plane is an orientation facing a user is relatively low. At this moment, the orientation of the first control plane may be determined to be different from the reference orientation. This solution uses an image acquisition component such as a camera on an electronic device and through an image identifying manner to determine whether the orientation of the first control plane is the reference orientation. The solution is simple, and accuracy is high without a need to add extra elements to the electronic device. The costs are relatively low.

Optionally, the determining the orientation of the first control plane as the reference orientation comprises: separately acquiring a first signal reception condition of the orientation of the first control plane and a second signal reception condition of the orientation of the second control plane; comparing the first signal reception condition with the second signal reception condition; and determining the orientation of the first control plane as the reference orientation at least according to a comparison result of the signal reception conditions. The orientation of the first control plane is different from that the second control plane. Therefore, reception conditions of signal sent out by the same signal source may have differences. Differences of signal reception conditions on different control planes may be a determining basis that whether the orientation of the first control plane is the reference orientation. For example, a signal may be sent to the electronic device through an outside signal source. For example, the signal may be sent to the electronic device held by the user through smart glasses worn by the user. The sent signal may comprise but is not limited to an optical signal, an ultrasonic signal and/or a radio frequency electromagnetic signal. If the orientation of the first control plane of the electronic device is the orientation (that is the reference orientation) facing the user, the first signal reception condition of the orientation of the first control plane may be capable of receiving the signal and/or received signal is strong, and so on. The orientation of the second control plane of the electronic device is back to the user (that is different from the reference orientation). The second signal reception condition of the orientation of the second control plane may not be capable of receiving the signal and/or received signal weak, and so on. It may be determined that whether the orientation of the first control plane is the reference orientation through comparing the signal reception conditions of these two control planes. This solution may be used to intelligently determine the orientation of the first control plane.

Optionally, the determining the orientation of the first control plane as the reference orientation comprises: acquiring reflected signal detecting condition of the signal that is transmitted by the electronic device along the orientation of the first control plane and/or the orientation of the second control plane; and determining the orientation of the first control plane as the reference orientation according to the reflected signal detecting condition. Under some circumstances, for example, under the circumstance that a user holds the electronic device, the reflected signal detecting conditions of the signals that are transmitted by the electronic device along the orientations of different control planes differ based on whether the control plane is facing a palm of the user. The control plane facing the palm is usually back to the user. Therefore, a signal may be transmitted through an electronic device along the orientation of the first control plane and/or the orientation of the second control plane; and then detect the reflected signal of the transmitted signal. A detecting value of the transmitted signal may be a determining basis for determining the orientation of the first control plane. The transmitted signal may comprise but is not limited to an optical signal, an ultrasonic signal and/or a radio frequency electromagnetic signal. If the electronic device transmits a signal along an orientation of a control plane, and a reflected signal of the transmitted signal can be detected within a certain time window, it shows that possibility that the control plane faces a palm is relatively high, and so on. This solution may be used to intelligently determine the orientation of the first control plane.

Optionally, the determining the orientation of the first control plane as the reference orientation comprises: separately acquiring a first detecting light intensity of the orientation of the first control plane and a second detecting light intensity of the orientation of the second control plane; comparing the first detecting light intensity with the second detecting light intensity; and determining the orientation of the first control plane as the reference orientation at least according to a comparison result of the detecting light intensities. The orientation of the first control plane is different from that of the second control plane. Therefore, the detecting conditions of ambient light may have differences. Under some circumstances, a light intensity of ambient light of an orientation facing a user is usually stronger than a light intensity of ambient light of an orientation back to the user. If a detecting light intensity of ambient light an orientation of a first control plane of an electronic device is stronger than a detecting light intensity of ambient light an orientation of a second control plane, it shows the possibility that the first control plane faces a user if relatively high. This solution is beneficial to intelligently determining the orientation of the first control plane. A light intensity detection such as on ambient light may be realized by using an image sensor or a light sensor on an electronic device such as a mobile phone without a need to add extra elements. The costs are relatively low.

Optionally, the determining the orientation of the first control plane as the reference orientation comprises: separately acquiring first detecting temperature of the first control plane and second detecting temperature of the second control plane; comparing the first detecting temperature with the second detecting temperature; and determining the orientation of the first control plane as the reference orientation at least according to a comparison result of the detecting temperature. According to different contact conditions of a part of a human body and different control planes of an electronic device, temperature detected by a corresponding control plane is also different. For example, under a circumstance that a user holds the electronic device, if the first control plane is back to a palm of the user (usually corresponding to a circumstance that the first control plane faces a user) and the second control plane faces the palm of the user, the second control plane is closer to the palm of the user than the first control plane. Detecting temperature can be performed by a temperature sensor disposed on a corresponding control plane, if temperature of the first control plane is relatively low, the possibility that the first control plane faces the reference orientation is relatively high. Otherwise, it shows that possibility that the orientation of the first control plane faces the reference orientation is relatively low. This solution is beneficial to intelligently determining the orientation of the first control plane.

Optionally, the determining the orientation of the first control plane as the reference orientation comprises: separately acquiring a first detecting sound signal of the first control plane and a second detecting sound signal of the second control plane; comparing the first detecting sound signal with the second detecting sound signal; and determining the orientation of the first control plane as the reference orientation at least according to a comparison result of the detecting sound signals. Under some circumstances, according to a relative location between a user and different control planes of an electronic device when the user is speaking through the device, sound signals detected by a loudspeaker on a corresponding control plane might be different. For example, if the first detecting sound signal is stronger than the second detecting sound signal, it shows the possibility that the first control plane faces a user is relatively high. Otherwise, it shows that the possibility that the orientation of the first control plane faces a user is relatively low. This solution is beneficial to intelligently determining the orientation of the first control plane by using a loudspeaker on an electronic device.

Optionally, the determining the orientation of the first control plane as the reference orientation comprises: separately acquiring a first induced capacitor area of the first control plane and a second induced capacitor area of the second control plane; comparing the first induced capacitor area with the second induced capacitor area; and determining the orientation of the first control plane as the reference orientation at least according to a comparison result of the induced capacitor areas. Under some circumstances, if a corresponding control plane is a capacitive screen, according to different contact areas of a user and different control planes when holding an electronic device, induced capacitor areas detected by different control planes may be different. When a user holds an electronic device, a contact area of a part of a human body on a control plane facing the user is usually smaller than a contact area of a part of a human body on a control plane (the control plane close to a palm) back to the user. Therefore, if the first induced capacitor area is smaller than the second induced capacitor area, it shows that possibility that the orientation of the first control plane faces the user is relatively high. Otherwise, it shows that the possibility that the orientation of the first control plane faces the user is relatively low. This solution is beneficial to intelligently determining the orientation of the first control plane by adopting or reusing a capacitive screen sensor on an electronic device.

Optionally, the determining the orientation of the first control plane as the reference orientation comprises: acquiring a detecting value of a gravity sensor of the electronic device; and determining the orientation of the first control plane as the reference orientation at least according to the detecting value. Under some circumstances, according to a different relative location between an electronic device and a horizontal plane, components of a detecting value of a gravity sensor within a coordinate system may be different. For example, suppose the first control plane is a front of an electronic device, if a component product of a detecting value of a gravity acceleration sensor on a z axis is positive, it shows the possibility that the orientation of the first control plane is the orientation facing a user is relatively high. Otherwise, it shows the possibility that the orientation of the first control plane is the orientation facing a user is relatively low. This solution is beneficial to intelligently determining the orientation of the first control plane by adopting or reusing a gravity sensor on an electronic device.

Optionally, the determining the orientation of the first control plane as the reference orientation comprises: acquiring a proximity sensor detecting signal of the first control plane and/or a proximity sensor detecting signal of the second control plane; and determining the orientation of the first control plane as the reference orientation according to the proximity sensor detecting signal. Proximity sensor may be configured to detect if there is an object getting close within a close range (for example, within a range of 5 cm). Under some circumstances, for example, under the circumstance that a user holds the electronic device, detecting whether there is an object getting close through a proximity sensor disposed on a first control plane and/or a second control plane, and the a getting-close status lasts for a certain period of time. If the first control plane detects that there is an object getting close and a getting-close status lasts for a certain period of time, it shows the possibility that the first control plane is close to a hand of the user holding the electronic device is relatively high. That is, the possibility that the orientation of the first control plane is the orientation back to the user is relatively high. Otherwise, it shows the possibility that the orientation of the first control plane is the orientation facing the user is relatively high. This solution is beneficial to intelligently determining the orientation of the first control plane by adopting or reusing a proximity sensor on an electronic device.

During the practical application process of determining the orientation of the first control plane, according to the image identifying result, the comparison result of the signal reception conditions, the comparison result of the detecting light intensities, the reflected signal detecting value, the comparison result of the detecting temperature, the comparison result of the detecting sound, the comparison result of the induced capacitor areas, the detecting value of the gravity sensor, or the proximity sensor detecting value, or one of the other factors, the orientation of the first control plane may be determined. For example, if the possibility that a corresponding parameter represents the orientation of the first control plane as the reference orientation is relatively high, the orientation of the first control plane is directly determined as the reference orientation. Or the image identifying result, the comparison result of the signal reception conditions, the comparison result of the detecting light intensities, the reflected signal detecting value, the comparison result of the detecting temperature, the comparison result of the detecting sound, the comparison result of the induced capacitor areas, the detecting value of the gravity sensor, and the proximity sensor detecting value, or two or more of the other factors are considered to determine the orientation of the first control plane as the reference orientation together, thereby improving accuracy of intelligently determining the orientation of the first control plane. Further, before any unlocking control method provided by the embodiments of this application determines the orientation of the first control plane as the reference orientation, the method further comprises: triggering execution of determining the orientation of the first control plane as the reference orientation. This solution improves intellectualization of the unlocking control, and is convenient for a user. The triggering control method of the triggering execution of determining operation on the orientation of the first control plane may be determined according to actual needs. An implementation manner is very flexible.

An optional implementation manner may adopt a human-machine interactive manner, and a user participates in the triggering control. For example, the triggering execution of determining the orientation of the first control plane as the reference orientation comprises: acquiring second input information configured to represent whether to trigger execution of determining the orientation of the first control plane as the reference orientation; and triggering execution of determining the first control plane as the reference orientation according to the second input information. Specifically and optionally, selecting information whether to trigger execution of determining the orientation of the first control plane as the reference orientation may be displayed on the first control plane, according to an input result of the information selected by the user, determining whether to execute the determining operation of the orientation of the first control plane as the reference orientation; if the user selects "Yes", executing the determining operation of the orientation of the first control plane as the reference orientation; or if the user selects "No", not executing the determining operation of the orientation of the first control plane as the reference orientation. This solution is easy to be implemented.

In another optional implementation manner, an unlocking control apparatus may make determination automatically with reference to one or more kind of information to achieve intelligent triggering control.

For example, optionally, the triggering execution of determining the orientation of the first control plane as the reference orientation comprises: acquiring location information of the electronic device; and triggering execution of determining the orientation of the first control plane as the reference orientation at least according to the location information. An acquiring method of the location information of the electronic device is very flexible. The method may comprise but is not limited to a method of locating through GPS or WiFi. Different locations in which the electronic device is located may have different influence on privacy of unlocking. For example, for a public place, a layout of people and detecting devices might be relatively intensive and complex. For a non-public place such as a residence, information is relatively more secure. During a process of practical application, some places (such as a residential area) with better privacy may be predetermined as a secure location range with no need to trigger execution of determining the orientation of the first control plane as the reference orientation. If current location information of the electronic device is within the secure location range, possibility of needing to execute the determining operation of the orientation of the first control plane as the reference orientation is relatively high. Otherwise, possibility of needing to execute the determining operation of the orientation of the first control plane as the reference orientation is relatively low. This solution may determine whether to trigger switching control plane to acquire unlocking input information of the first control plane with reference to location information of an electronic device, which may better satisfy various practical application needs of a user.

For example, optionally, the triggering execution of determining the orientation of the first control plane as the reference orientation comprises: acquiring environment information of the electronic device; and triggering execution of determining the orientation of the first control plane as the reference orientation at least according to the environment information. Different environment in which the electronic device is located may have different influence on unlocking privacy. A public place, relative to a non-public place, the unlocking privacy is not as good. A current environment type of the electronic device may be determined by referring to parameters such as environment noise. For example, the environment noise of the electronic device may be detected. If the a detecting value of the environment noise is greater than a threshold value, the possibility of needing to execute the determining operation of the orientation of the first control plane as the reference orientation is relatively high. Otherwise, the possibility of needing to execute the determining operation of the orientation of the first control plane as the reference orientation is relatively low. This solution may determine whether to trigger switching control plane to acquire unlocking input information of the first control plane with reference to environment information of an electronic device, which may better satisfy various practical application needs of a user.

During an application process of controlling triggering execution of determining the orientation of the first control plane as the reference orientation, according to the location information of the electronic device, or the environment information, or one of the other reference information, intelligent triggering control is performed. For example, if the possibility that a corresponding parameter represents the need of executing the determining operation of the orientation of the first control plane as the reference orientation is relatively high, execution of determining the orientation of the first control plane as the reference orientation may be triggered directly. Or, the location information of the electronic device, the environment information, or two or more of the other reference information may be considered to perform triggering control together, thereby improving accuracy of the intelligent triggering control.

A person skilled in the art may understand that in any method of the specific implementation manners, a sequence number of each step does not mean a sequence of execution. An executing sequence of each step should be determined according to a function of each step and eternal logic, and not to limit the invention in any way.

Figure 4:
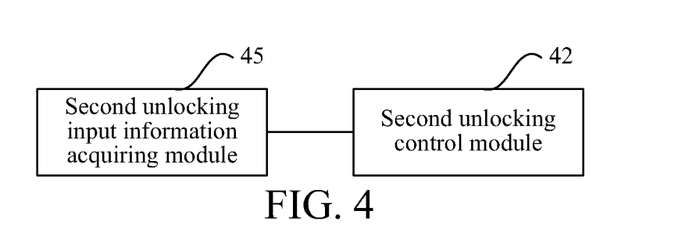
FIG. 4 is a logic block diagram of a first unlocking control apparatus provided by an embodiment of this application.

FIG. 4 is a logic block diagram of an unlocking control apparatus provided by an embodiment of this application. As shown in FIG. 4, an unlocking control apparatus provided by an embodiment of this application comprises: a second unlocking input information acquiring module 45 and a second unlocking control module 42.

The second unlocking input information acquiring module 45 is configured to: in response to an orientation of a to-be-unlocked first control plane of an electronic device as a reference orientation, acquire second unlocking input information through a second control plane of the electronic device, and an orientation of the second control plane and the orientation of the first control plane are different.

The second unlocking control module 42 is configured to unlock the first control plane according to the second unlocking input information.

A device representation form of the unlocking control apparatus provided by the embodiments of this application is not limited. For example, the unlocking control apparatus may be an independent component. The component communicates with an electronic device to realize the control to the electronic device. Or the unlocking control apparatus may also be integrated within an electronic device as a functional module, etc., which is not limited by this application.

Technical solutions provided by the embodiments of this application may make full use of the characteristic that an electronic device has at least two control planes with different orientations. Under the circumstance that the to-be-unlocked first control plane needs to be unlocked, according to the orientation of the first control plane and a reference orientation, determining a corresponding unlocking input information acquiring strategy; if the orientation of the first control plane is the reference orientation, acquiring second unlocking input information through a second control plane of another orientation of the electronic device; and according to the second unlocking input information, unlocking the first control plane. The solution enables the unlocking control information of the first control plane to be input on the second control plane whose orientation of is different from the orientation of the reference orientation, so that the possibility that the unlocking control information of the first control plane is acquired by other people or a detection device is reduced, thereby improving privacy and security of the unlocking control.

Figure 5:
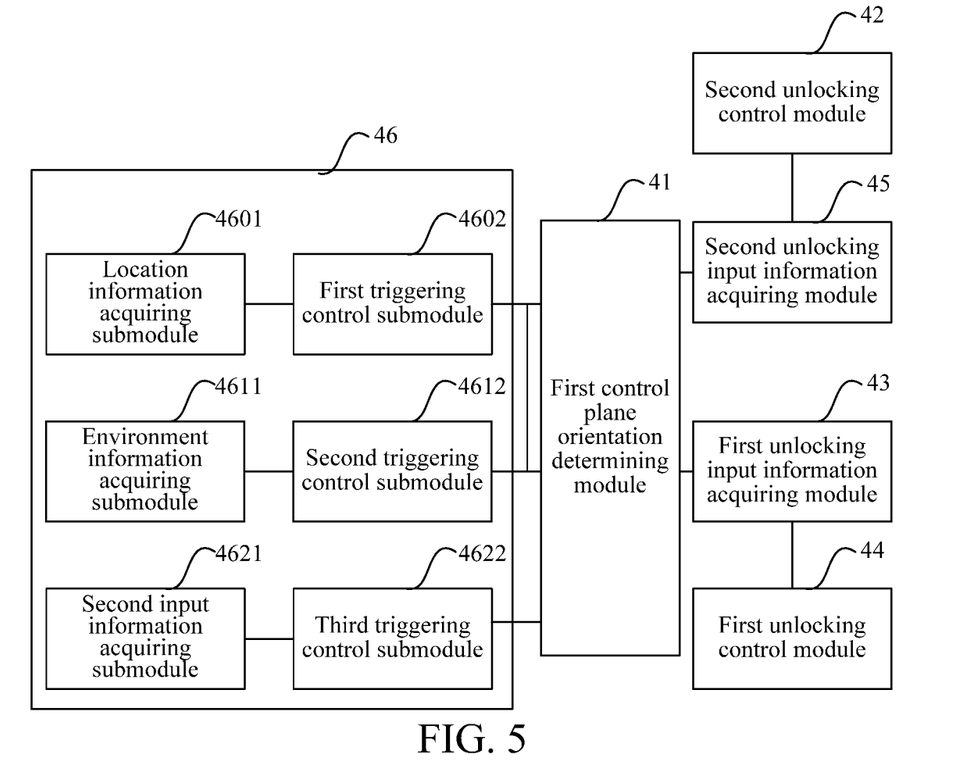
FIG. 5 is a logic block diagram of a second unlocking control apparatus provided by an embodiment of this application.

Optionally, as shown in FIG. 5, the unlocking control apparatus may further comprise: a first unlocking input information acquiring module 43 and a first unlocking control module 44. The first unlocking input information acquiring module 43 is configured to: in response to the orientation of the first control plane being different from the reference orientation, acquire first unlocking input information through the first control plane; and the first unlocking control module 44 is configured to unlock the first control plane according to the first unlocking input information.

Optionally, the unlocking control apparatus may further comprise: a first control plane orientation determining module 41. The first control plane orientation determining module 41 is configured to determine the orientation of the first control plane as the reference orientation, and enable the second unlocking input information acquiring module according to a determining result. This solution, according to the orientation of the first control plane, may flexibly determine whether it needs to be switched into a second control plane to acquire the unlocking input information, which improves the flexibility of this solution.

Optionally, the reference orientation is an orientation facing a user. Practice shows that the orientation facing the user is usually the orientation from which other people or a detecting device in the environment may relatively easily acquire the input information by the user. Therefore, the orientation facing the user may be determined as the reference orientation, which improves universality of the solution.

Optionally, the orientation of the second control plane and that of the first control plane are opposite. With adoption of this solution, when a user inputs the second unlocking input information through the second control plane, the first control plane, the first control plane blocks input or display information of the second control plane to a certain degree, thereby improving security of the unlocking input information.

Optionally, the first unlocking input information and the second unlocking input information are the same. This solution switches a control plane configured to acquire unlocking input information between two control planes with different orientations, thereby improving security of unlocking input information. Or, optionally, the first unlocking input information and the second unlocking input information are different. This application is convenient for a user to operate. Through a proper design of the second unlocking input information, the security of the unlocking control may be further improved.

The determining method for the orientation of the first control plane as the reference orientation may be determined according to actual needs. An implementation manner is very flexible.

In an optional implementation manner, an unlocking control apparatus may perform determination automatically, with reference to one or more kind of information, the orientation of the first control plane as the reference orientation.

Figure 6:
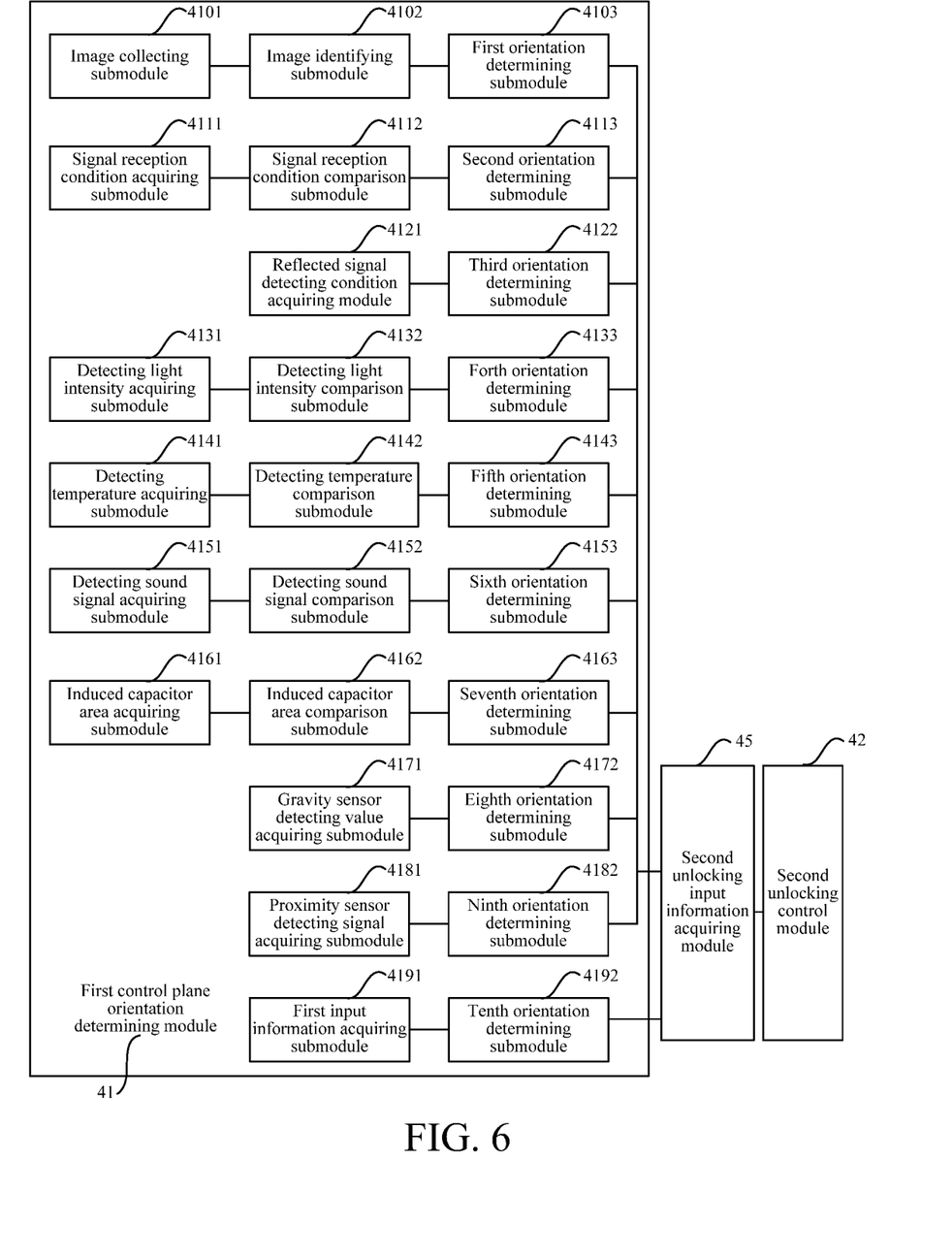
FIG. 6 is a logic block diagram of a third unlocking control apparatus provided by an embodiment of this application.

Optionally, as shown in FIG. 6, the first control plane orientation determining module 41 comprises: an image collecting submodule 4101, an image identifying submodule 4102, and a first orientation determining submodule 4103. The image collecting submodule 4101 is configured to collect an image along the orientation of the first control plane; the image identifying submodule 4102 is configured to identify the image; and the first orientation determining submodule 4103 is configured to determine the orientation of the first control plane as the reference orientation at least according to an identifying result of the image. This solution achieves intelligent determination of the first control plane orientation through using an image acquisition apparatus such as a camera on an electronic device.

Optionally, the first control plane orientation determining module 41 comprises: a signal reception condition acquiring submodule 4111, a signal reception condition comparison submodule 4112, and a second orientation determining submodule 4113. The signal reception condition acquiring submodule 4111 is configured to separately acquire a first signal reception condition of the orientation of the first control plane and a second signal reception condition of the orientation of the second control plane; the signal reception condition comparison submodule 4112 is configured to compare the first signal reception condition with the second signal reception condition; and the second orientation determining submodule 4113 is configured to determine the orientation of the first control plane as the reference orientation at least according to a comparison result of the signal reception conditions. This solution is beneficial to intelligently determining the orientation of the first control plane.

Optionally, the first control plane orientation determining module 41 comprises: a reflected signal detecting condition acquiring module 4121 and a third orientation determining submodule 4122. The reflected signal detecting condition acquiring module 4121 is configured to acquire reflected signal detecting condition of the signal that is transmitted by the electronic device along the orientation of the first control plane and/or the orientation of the second control plane; and the third orientation determining submodule 4122 is configured to determine the orientation of the first control plane as the reference orientation according to the reflected signal detecting condition. This solution is beneficial to intelligently determining the orientation of the first control plane.

Optionally, the first control plane orientation determining module 41 comprises: a detecting light intensity acquiring submodule 4131, a detecting light intensity comparison submodule 4132, and a forth orientation determining submodule 4133. The detecting light intensity acquiring submodule 4131 is configured to separately acquire a first detecting light intensity of the orientation of the first control plane and a second detecting light intensity of the orientation of the second control plane; the detecting light intensity comparison submodule 4132 is configured to compare the first detecting light intensity with the second detecting light intensity; and the forth orientation determining submodule 4133 is configured to determine the orientation of the first control plane as the reference orientation at least according to a comparison result of the detecting light intensities. This solution is beneficial to intelligent determining of the orientation of the first control plane.

Optionally, the first control plane orientation determining module 41 comprises: a detecting temperature acquiring submodule 4141, a detecting temperature comparison submodule 4142, and a fifth orientation determining submodule 4143. The detecting temperature acquiring submodule 4141 is configured to separately acquire first detecting temperature of the orientation of the first control plane and second detecting temperature of the orientation of the second control plane; the detecting temperature comparison submodule 4142 is configured to compare the first detecting temperature with the second detecting temperature; and the fifth orientation determining submodule 4143 is configured to determine the orientation of the first control plane as the reference orientation at least according to a comparison result of the detecting temperatures. This solution is beneficial to intelligently determining the orientation of the first control plane.

Optionally, the first control plane orientation determining module 41 comprises: a detecting sound signal acquiring submodule 4151, a detecting sound signal comparison submodule 4152, and a sixth orientation determining submodule 4153. The detecting sound signal acquiring submodule 4151 is configured to separately acquire a first detecting sound signal of the first control plane and a second detecting sound signal of the second control plane; the detecting sound signal comparison submodule 4152 is configured to compare the first detecting sound signal and the second detecting sound signal; and the sixth orientation determining submodule 4153 is configured to determine the orientation of the first control plane as the reference orientation at least according to a comparison result of the detecting sound signals. This solution is beneficial to intelligently determining the orientation of the first control plane by using a loudspeaker on an electronic device.

Optionally, the first control plane orientation determining module 41 comprises: an induced capacitor area acquiring submodule 4161, an induced capacitor area comparison submodule 4162, and a seventh orientation determining submodule 4163. The induced capacitor area acquiring submodule 4161 is configured to separately acquire a first induced capacitor area of the first control plane and a second induced capacitor area of the second control plane; the induced capacitor area comparison submodule 4162 is configured to compare the first induced capacitor area with the second induced capacitor area; and the seventh orientation determining submodule 4163 is configured to determine the orientation of the first control plane as the reference orientation at least according to a comparison result of the induced capacitor areas. This solution is beneficial to intelligently determining the orientation of the first control plane by using a capacitive screen sensor on an electronic device.

Optionally, the first control plane orientation determining module 41 comprises: a gravity sensor detecting value acquiring submodule 4171 and an eighth orientation determining submodule 4172. The gravity sensor detecting value acquiring submodule 4171 is configured to acquire a detecting value of a gravity sensor of the electronic device; and the eighth orientation determining submodule 4172 is configured to determine the orientation of the first control plane as the reference orientation at least according to the detecting value. This solution is beneficial to intelligently determining the orientation of the first control plane by using a gravity sensor on an electronic device.

Optionally, the first control plane orientation determining module 41 comprises: a proximity sensor detecting signal acquiring submodule 4181 and a ninth orientation determining submodule 4182. The proximity sensor detecting signal acquiring submodule 4181 is configured to acquire a proximity sensor detecting signal of the first control plane and/or that of the second control plane; and the ninth orientation determining submodule 4182 is configured to determine the orientation of the first control plane as the reference orientation according to the proximity sensor detecting signal. This solution is beneficial to intelligently determining the orientation of the first control plane by using a proximity sensor on an electronic device.

The first control plane orientation determining module, in practical application processes, may determine the orientation of the first control plane according to one of the image identifying result, the comparison result of the signal reception conditions, the comparison result of the detecting light intensities, the reflected signal detecting value, the comparison result of the detecting temperature, the comparison result of the detecting sound, the comparison result of the induced capacitor areas, the detecting value of the gravity sensor, or the proximity sensor detecting value or one of the other factors. For example, if the possibility that a corresponding parameter represents the orientation of the first control plane as the reference orientation is relatively high, the orientation of the first control plane is directly determined as the reference orientation. Or the image identifying result, the comparison result of the signal reception conditions, the comparison result of the detecting light intensities, the reflected signal detecting value, the comparison result of the detecting temperature, the comparison result of the detecting sound, the comparison result of the induced capacitor areas, the detecting value of the gravity sensor, and the proximity sensor detecting value, or two or more of the other factors may be considered to determine the orientation of the first control plane as the reference orientation, thereby improving accuracy of intelligent determining of the orientation of the first control plane.

Another optional implementation manner may adopt a human-machine interactive manner, and a user participates in the determining of the orientation of the first control plane. Optionally, the first control plane orientation determining module 41 comprises: a first input information acquiring submodule 4191 and a tenth orientation determining submodule 4192. The first input information acquiring submodule 4191 is configured to acquire first input information that is configured to represent whether the orientation of the first control plane is the reference orientation; and the tenth orientation determining submodule 4192 is configured to determine the orientation of the first control plane as the reference orientation according to the first input information. This solution is easy to be implemented.

Further, as shown in FIG. 5, the unlocking control apparatus may further comprise: a triggering control module 46. The triggering control module 46 is configured to control triggering of the first control plane orientation determining module.

The method of controlling triggering of determining the orientation of the first control plane may be determined according to actual needs. An implementation manner is very flexible.

In an optional implementation manner, an unlocking control apparatus may make determinations automatically with reference to one or more kind of information to achieve intelligent triggering control.

For example, the triggering control module 46 comprises: a location information acquiring submodule 4601 and a first triggering control submodule 4602. The location information acquiring submodule 4601 is configured to acquire location information of the electronic device; and the first triggering control submodule 4602 is configured to trigger execution of determining the orientation of the first control plane as the reference orientation at least according to the location information. This solution may determine whether to trigger switching control plane to acquire unlocking input information of the first control plane with reference to location information of an electronic device, which may better satisfy various practical application needs of a user.

For another example, the triggering control module 46 comprises: an environment information acquiring submodule 4611 and a second triggering control submodule 4612. The environment information acquiring submodule 4611 is configured to acquire environment information of the electronic device; and the second triggering control submodule 4612 is configured to trigger execution of determining the orientation of the first control plane as the reference orientation at least according to the environment information. This solution may determine whether to trigger switching control plane to acquire unlocking input information of the first control plane with reference to environment information of an electronic device, which may better satisfy various practical application needs of a user.

During an application process of controlling triggering a determining operation on the orientation of the first control plane as the reference orientation, according to the location information of the electronic device, the environment information, or one of the other reference information, intelligent triggering control is performed. For example, if the possibility that a corresponding parameter represents the need of executing the determining operation of the orientation of the first control plane as the reference orientation is relatively high, execution of determining the orientation of the first control plane as the reference orientation may be triggered directly. Or, the location information of the electronic device, the environment information, or two or more of the other reference information may be considered to triggering control, thereby improving accuracy of the intelligent triggering control.

Another optional implementation manner may adopt a human-machine interactive manner, and a user participates in the triggering control. For example, the triggering control module 46 comprises: a second input information acquiring submodule 4621 and a third triggering control submodule 4622. The second input information acquiring submodule 4621 is configured to acquire second input information that is configured to represent whether to trigger execution of determining the orientation of the first control plane as the reference orientation; and the third triggering control submodule 4622 is configured to trigger execution of determining the orientation of the first control plane as the reference orientation according to the second input information. This solution is easy to be implemented.

Figure 7:
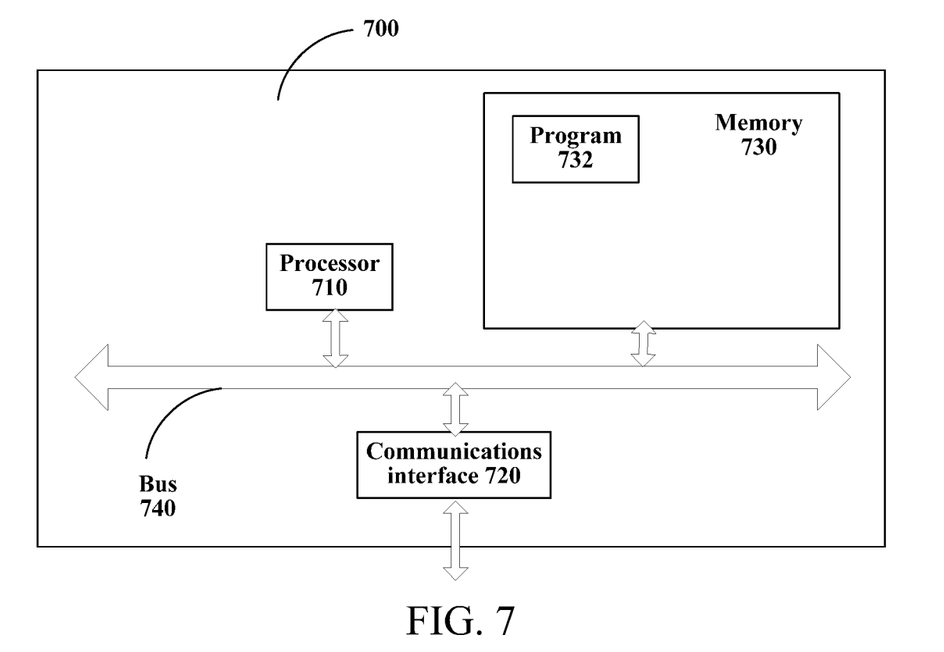
FIG. 7 is a logic block diagram of a forth unlocking control apparatus provided by an embodiment of this application.

FIG. 7 is a logic block diagram of a forth unlocking control apparatus provided by an embodiment of this application. The embodiment of this application does not limit a specific implementation manner of an unlocking control apparatus 700. As shown in FIG. 7, the unlocking control apparatus 700 may further comprise:

a processor (Processor) 710, a communications interface (Communications Interface) 720, a memory (Memory) 730, and a communication bus 740, where:

the processor 710, the communications interface 720, the memory 730, and the communication bus 740 complete the communication among each other.

The communications interface 720 is configured to communicate with, for example, a sound generating apparatus, and a device with an image sensor and/or an audio playback function.

The processor 710 is configured to execute a program 732, and specifically, may perform the relevant steps in the embodiments of any of the above methods.

For example, the program 732 may comprise program code, and the program code comprises computer operating instructions.

The processor 710 may be a central processing unit (Central Processing Unit, CPU for short), or an application specific integrated circuit (Application Specific Integrated Circuit, ASIC for short), or an integrated circuit or more integrated circuits configured to implement the embodiments of this application.

The memory 730 is configured to store a program 732. The memory 730 may comprise a random access memory (Random Access Memory, RAM for short), and may further comprise a non-volatile memory (Non-volatile memory), such as at least a magnetic disk storage.

For example, in an optional implementation manner, the processor 710, through executing the program 732, may perform the following steps: In response to an orientation of a to-be-unlocked first control plane of an electronic device as a reference orientation, acquire second unlocking input information through a second control plane of the electronic device, and an orientation of the second control plane and the orientation of the first control plane are different, and unlock the first control plane according to the second unlocking input information. In other optional implementation manners, the processor 710, through executing the program 732, may further perform a step mentioned by any of the above embodiments, which will not be described herein.

Reference may be made to the corresponding description of the corresponding steps, modules, and submodules in the above embodiments for specific implementation of the steps in the program 732, which will not be described herein. A person skilled in the art may know clearly that, for the sake of convenience and brevity of the description, reference may be made to the corresponding process description in the foregoing embodiments of the method for specific working process of the apparatus and modules described above, which will not be described herein.

Figure 8:
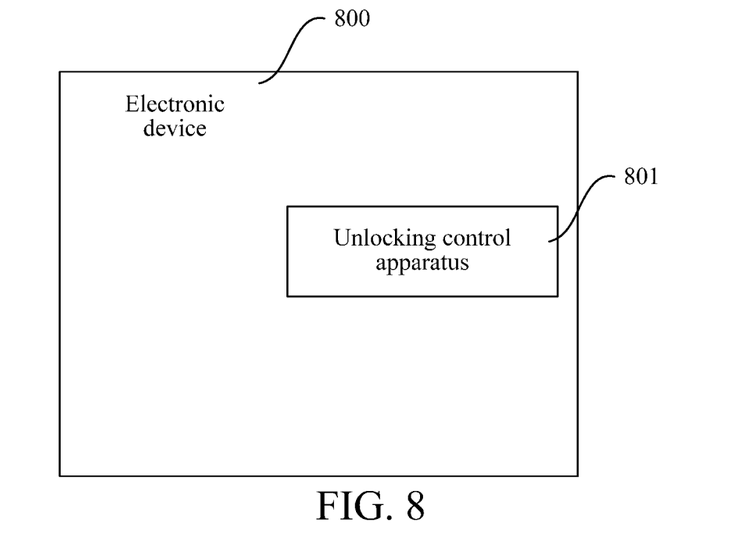
FIG. 8 is a logic block diagram of an electronic device provided by an embodiment of this application.

The embodiments of this application further provide an electronic device. As shown in FIG. 8, an electronic device 800 comprises at least two control planes with different orientations, and an unlocking control apparatus 801. The at least two control planes with different orientations comprise: a first control plane and a second control plane. The first control plane is to be unlocked. The unlocking control apparatus is any unlocking control apparatus provided by the embodiment of this application. Reference may be made to a corresponding record of other parts of the embodiments of this application for an optional representation form, an optional result, an operating principle, control relationship, and a technical effect that a corresponding technical solution may achieve, of the first control plane, the second control plane, and the unlocking control apparatus.

In the above embodiments of this application, a sequence number and/or sequence of the embodiments is merely for convenience of description, and does not represent the superiority or inferiority of the embodiments. Description of each embodiment has different emphasis. Reference may be made to related description of other embodiments for a part that is not described in detail in some embodiments. Reference may be made to a record of an embodiment of a corresponding method for an implementation principle or related description of a process of the embodiment of a related apparatus, device, or system.

A person of ordinary skill in the art can realize that with reference to the units and method steps of the examples that are described in the embodiments disclosed in the article, it can be achieved by electronic hardware, or the combination of computer software and electronic hardware. Whether these functions are executed by a hardware method or a software method depends on a particular application and the design constraint of the technical solutions. For each particular application, a professional may can use a different method to achieve one or more described functions, but such implementation should not be considered to go beyond the scope of this application.

When the functions are implemented as software function units or are sold or used as independent products, the functions may be stored in a computer readable storage medium. Based on such understanding, the technical solutions of this application essentially or the part that contributes to the existing technology or the part of the technical solution can be reflected in a form of a software product. The software product of the computer is stored in a storage medium, comprising multiple instructions configured to make a computer device (The computer device may be a personal computer, a server, or a network device, etc.) perform part of or all steps of the method of all embodiments of this application. The storage media comprise: a U disk, a removable hard disk, a read-only memory (Read-Only Memory, ROM for short), a random access memory (Random Access Memory, RAM for short), a magnetic disk, an optical disk, or any other medium that can store program code.

In an apparatus, a method, and a system of the embodiments of this application, obviously, each component (a system, a subsystem, a module, a submodule, a unit, a subunit, and the like) or each step may be disassembled, combined and/or recombined after being disassembled. The disassembly and recombination should be viewed as an equivalent solution of this application. In addition, in the above description of the specific embodiments of this application, the description of an implementation manner and/or an illustrated characteristic can be used in one or more other implementation manners in a same or similar manner, combined with a characteristic in other implementation manners or replacing a characteristic in other implementation manners.

It should be noted that a term "comprise/contain" is used in the article to refer to existence of a characteristic, an element, a step, or a subassembly, but not preclude, existence or addition of one or more other characteristics, elements, steps or subassemblies.

Finally, it should be noted that the above implementation manners are only used to illustrate this application rather than to limit this application. Many alterations and modifications may be made by a person of ordinary skill in the relevant art without departing from the spirit and scope of this application. Therefore, all equivalent technical solutions also belong to the scope of this application. The patent protection scope of this application should be defined by the claims.

What is claimed is:

1. An unlocking control method, comprising:
 under a circumstance that a first control plane of an electronic device is controlled to be unlocked, according to an orientation of the first control plane and a reference orientation, determining a corresponding unlocking input information acquiring strategy;
 collecting an image along the orientation of the first control plane;

identifying the image;
determining whether the orientation of the first control plane is the reference orientation at least according to an identifying result of the image;
in response to determining that the orientation of the first control plane is the reference orientation, acquiring second unlocking input information through a second control plane of the electronic device, wherein an orientation of the second control plane and the orientation of the first control plane are different, and the reference orientation is an orientation facing a user; and
unlocking the first control plane according to the second unlocking input information.

2. The method of claim 1, further comprising:
in response to the orientation of the first control plane being different from the reference orientation, acquiring first unlocking input information through the first control plane; and
unlocking the first control plane according to the first unlocking input information.

3. The method of claim 1, wherein the orientation of the second control plane and the orientation of the first control plane are opposite.

4. The method of claim 2, wherein the first unlocking input information and the second unlocking input information are the same.

5. The method of claim 2, wherein the first unlocking input information and the second unlocking input information are different.

6. The method of claim 1, wherein the determining whether the orientation of the first control plane is the reference orientation comprises:
separately acquiring a first signal reception condition of the orientation of the first control plane and a second signal reception condition of the orientation of the second control plane;
comparing the first signal reception condition with the second signal reception condition; and
determining whether the orientation of the first control plane is the reference orientation at least according to a comparison result of the first signal reception condition and the second signal reception condition.

7. The method of claim 1, wherein the determining whether the orientation of the first control plane is the reference orientation comprises:
acquiring a reflected signal detecting condition of a signal that is transmitted by the electronic device along the orientation of the first control plane and/or the orientation of the second control plane; and
determining whether the orientation of the first control plane is the reference orientation according to the reflected signal detecting condition.

8. The method of claim 1, wherein the determining whether the orientation of the first control plane is the reference orientation comprises:
separately acquiring a first detecting light intensity of the orientation of the first control plane and a second detecting light intensity of the orientation of the second control plane;
comparing the first detecting light intensity with the second detecting light intensity; and
determining whether the orientation of the first control plane is the reference orientation at least according to a comparison result of the first detecting light intensity and the second detecting light intensity.

9. The method of claim 1, wherein the determining whether the orientation of the first control plane is the reference orientation comprises:
separately acquiring a first detecting temperature of the first control plane and a second detecting temperature of the second control plane;
comparing the first detecting temperature with the second detecting temperature; and
determining whether the orientation of the first control plane is the reference orientation at least according to a comparison result of the first detecting temperature and the second detecting temperature.

10. The method of claim 1, wherein the determining whether the orientation of the first control plane is the reference orientation comprises:
separately acquiring a first detecting sound signal of the first control plane and a second detecting sound signal of the second control plane;
comparing the first detecting sound signal with the second detecting sound signal; and
determining whether the orientation of the first control plane is the reference orientation at least according to a comparison result of the first detecting sound signal and the second detecting sound signal.

11. The method of claim 1, wherein the determining whether the orientation of the first control plane is the reference orientation comprises:
separately acquiring a first induced capacitor area of the first control plane and a second induced capacitor area of the second control plane;
comparing the first induced capacitor area with the second induced capacitor area; and
determining whether the orientation of the first control plane is the reference orientation at least according to a comparison result of the first induced capacitor area and the second induced capacitor area.

12. The method of claim 1, wherein the determining whether the orientation of the first control plane is the reference orientation comprises:
acquiring a detecting value of a gravity sensor of the electronic device; and
determining whether the orientation of the first control plane is the reference orientation at least according to the detecting value.

13. The method of claim 1, wherein the determining whether the orientation of the first control plane is the reference orientation comprises:
acquiring a proximity sensor detecting signal of the first control plane and/or a proximity sensor detecting signal of the second control plane; and
determining whether the orientation of the first control plane is the reference orientation according to the proximity sensor detecting signal.

14. The method of claim 1, wherein the determining whether the orientation of the first control plane is the reference orientation comprises:
acquiring first input information configured to represent whether the orientation of the first control plane is the reference orientation; and
determining whether the orientation of the first control plane is the reference orientation according to the first input information.

15. The method of claim 1, further comprising: before the determining whether the orientation of the first control plane is the reference orientation, triggering execution of determining whether the orientation of the first control plane is the reference orientation.

16. The method of claim 15, wherein the triggering execution of determining whether the orientation of the first control plane is the reference orientation comprises:
acquiring location information of the electronic device; and
triggering execution of determining whether the orientation of the first control plane is the reference orientation at least according to the location information.

17. The method of claim 15, wherein the triggering execution of determining whether the orientation of the first control plane is the reference orientation comprises:
acquiring environment information of the electronic device; and
triggering execution of determining whether the orientation of the first control plane is the reference orientation at least according to the environment information.

18. The method of claim 15, wherein the triggering execution of determining whether the orientation of the first control plane is the reference orientation comprises:
acquiring second input information configured to represent whether to trigger execution of determining the orientation of the first control plane as the reference orientation; and
triggering execution of determining whether the orientation of the first control plane is the reference orientation according to the second input information.

19. An unlocking control apparatus, comprising:
an unlocking input information acquiring module, configured to:
under a circumstance that a first control plane of an electronic device is controlled to be unlocked, according to an orientation of the first control plane and a reference orientation, determine a corresponding unlocking input information acquiring strategy;
collect an image along the orientation of the first control plane;
identify the image;
determine whether the orientation of the first control plane is the reference orientation at least according to an identifying result of the image;
in response to determining that the orientation of the first control plane is the reference orientation, acquire second unlocking input information through a second control plane of the electronic device, wherein an orientation of the second control plane and the orientation of the first control plane are different, and the reference orientation is an orientation facing a user; and
an unlocking control module, configured to unlock the first control plane according to the second unlocking input information.

20. An unlocking control apparatus, comprising a processor and a memory, the memory storing computer executable instructions that, in response to execution, cause the unlocking control apparatus to perform operations comprising:
under a circumstance that a first control plane of an electronic device is controlled to be unlocked, according to an orientation of the first control plane and a reference orientation, determining a corresponding unlocking input information acquiring strategy;
collecting an image along the orientation of the first control plane;
identifying the image;
determining whether the orientation of the first control plane is the reference orientation at least according to an identifying result of the image;
in response to determining that the orientation of the first control plane is the reference orientation, acquiring second unlocking input information through a second control plane of the electronic device, wherein an orientation of the second control plane and the orientation of the first control plane are different, and the reference orientation is an orientation facing a user; and
unlocking the first control plane according to the second unlocking input information.

21. The apparatus of claim 20, wherein the operations further comprise:
in response to the orientation of the first control plane being different from the reference orientation, acquiring first unlocking input information through the first control plane; and
unlocking the first control plane according to the first unlocking input information.

22. The apparatus of claim 20, wherein the orientation of the second control plane and the orientation of the first control plane are opposite.

23. The apparatus of claim 21, wherein the first unlocking input information and the second unlocking input information are the same.

24. The apparatus of claim 21, wherein the first unlocking input information and the second unlocking input information are different.

25. The apparatus of claim 20, wherein the operations further comprise:
separately acquiring a first signal reception condition of the orientation of the first control plane and a second signal reception condition of the orientation of the second control plane;
comparing the first signal reception condition with the second signal reception condition; and
determining whether the orientation of the first control plane is the reference orientation at least according to a comparison result of the first signal reception condition and the second signal reception condition.

26. The apparatus of claim 20, wherein the operations further comprise:
acquiring a reflected signal detecting condition of the signal that is transmitted by the electronic device along the orientation of the first control plane and/or the orientation of the second control plane; and
determining whether the orientation of the first control plane is the reference orientation according to the reflected signal detecting condition.

27. The apparatus of claim 20, wherein the operations further comprise:
separately acquiring a first detecting light intensity of the orientation of the first control plane and a second detecting light intensity of the orientation of the second control plane;
comparing the first detecting light intensity with the second detecting light intensity; and
determining whether the orientation of the first control plane is the reference orientation at least according to a comparison result of the first detecting light intensity and the second detecting light intensity.

28. The apparatus of claim 20, wherein the operations further comprise:

separately acquiring a first detecting temperature of the orientation of the first control plane and a second detecting temperature of the orientation of the second control plane;

comparing the first detecting temperature with the second detecting temperature; and determining whether the orientation of the first control plane is the reference orientation at least according to a comparison result of the first detecting temperature and the second detecting temperature.

29. The apparatus of claim 20, wherein the operations further comprise:

separately acquiring a first detecting sound signal of the first control plane and a second detecting sound signal of the second control plane;

comparing the first detecting sound signal and the second detecting sound signal; and determining whether the orientation of the first control plane is the reference orientation at least according to a comparison result of the first detecting sound signal and the second detecting sound signal.

30. The apparatus of claim 20, wherein the operations further comprise:

separately acquiring a first induced capacitor area of the first control plane and a second induced capacitor area of the second control plane;

comparing the first induced capacitor area with the second induced capacitor area; and determining whether the orientation of the first control plane is the reference orientation at least according to a comparison result of the first induced capacitor area and the second induced capacitor area.

31. The apparatus of claim 20, wherein the operations further comprise:

acquiring a detecting value of a gravity sensor of the electronic device; and determining whether the orientation of the first control plane is the reference orientation at least according to the detecting value.

32. The apparatus of claim 20, wherein the operations further comprise:

acquiring at least one proximity sensor detecting signal of the first control plane and the second control plane; and determining whether the orientation of the first control plane is the reference orientation according to the at least one proximity sensor detecting signal.

33. The apparatus of claim 20, wherein the operations further comprise:

acquiring first input information that is configured to represent whether the orientation of the first control plane is the reference orientation; and determining whether the orientation of the first control plane is the reference orientation according to the first input information.

34. The apparatus of claim 20, wherein the operations further comprise:

triggering execution of determining whether the orientation of the first control plane is the reference orientation.

35. The apparatus of claim 34, wherein the operations further comprise:

acquiring location information of the electronic device; and triggering the execution of determining whether the orientation of the first control plane is the reference orientation at least according to the location information.

36. The apparatus of claim 34, wherein the operations further comprise:

acquiring environment information of the electronic device; and triggering the execution of determining whether the orientation of the first control plane is the reference orientation at least according to the environment information.

37. The apparatus of claim 34, wherein the operations further comprise:

acquiring second input information that is configured to represent whether to trigger the execution of determining whether the orientation of the first control plane is the reference orientation; and triggering the execution of determining whether the orientation of the first control plane is the reference orientation according to the second input information.

38. An electronic device, comprising at least two control planes with different orientations and the unlocking control apparatus of claim 20.

39. A non-transitory computer-readable storage medium, comprising at least one set of executable instructions, which, in response to execution, cause a processor to perform operations comprising:

under a circumstance that a first control plane of an electronic device is controlled to be unlocked, according to an orientation of the first control plane and a reference orientation, determining a corresponding unlocking input information acquiring strategy;

collecting an image along the orientation of the first control plane;

identifying the image;

determining whether the orientation of the first control plane is the reference orientation at least according to an identifying result of the image;

in response to determining that the orientation of the first control plane is the reference orientation, acquiring second unlocking input information through a second control plane of the electronic device, wherein an orientation of the second control plane and the orientation of the first control plane are different, and the reference orientation is an orientation facing a user; and unlocking the first control plane according to the second unlocking input information.

* * * * *